United States Patent
Thörn (10) Patent No.: US 10,606,950 B2
(45) Date of Patent: Mar. 31, 2020

(54) CONTROLLING PLAYBACK OF SPEECH-CONTAINING AUDIO DATA

(71) Applicant: Sony Mobile Communications Inc., Tokyo (JP)

(72) Inventor: Ola Thörn, Lund (SE)

(73) Assignee: Sony Mobile Communications, Inc., Tokyo (JP)

( * ) Notice: Subject to any disclaimer, the term of this patent is extended or adjusted under 35 U.S.C. 154(b) by 0 days.

(21) Appl. No.: 16/084,414

(22) PCT Filed: Mar. 16, 2016

(86) PCT No.: PCT/EP2016/055626
§ 371 (c)(1),
(2) Date: Sep. 12, 2018

(87) PCT Pub. No.: WO2017/157428
PCT Pub. Date: Sep. 21, 2017

(65) Prior Publication Data
US 2019/0079918 A1    Mar. 14, 2019

(51) Int. Cl.
*G06F 17/27*    (2006.01)
*G06F 3/16*    (2006.01)
(Continued)

(52) U.S. Cl.
CPC ............ *G06F 17/277* (2013.01); *G06F 3/165* (2013.01); *G06F 3/167* (2013.01); *G10L 15/05* (2013.01); *G10L 15/22* (2013.01); *G10L 15/26* (2013.01); *G11B 27/102* (2013.01); *G11B 27/28* (2013.01); *G10L 17/00* (2013.01); *G10L 2015/088* (2013.01); *G10L 2015/223* (2013.01)

(58) Field of Classification Search
CPC ........ G06F 17/277; G06F 3/167; G06F 3/165; G10L 15/22; G10L 15/26; G10L 15/05; G10L 2015/223; G10L 17/00; G10L 2015/088; G11B 27/28; G11B 27/102
USPC .......................................................... 704/9
See application file for complete search history.

(56) References Cited

U.S. PATENT DOCUMENTS 6,985,864 B2 *  1/2006  Nagao ..................... G10L 13/00
                                                      704/257
8,358,917 B2 *  1/2013  Schmouker .............. H04N 5/76
                                                      386/349

(Continued)

OTHER PUBLICATIONS

Appadvice, Mar. 15, 2016, "Best Universal Audiobook Apps", image from Mar. 15, 2016, recovered from internet archive.*

(Continued)

*Primary Examiner* — Edwin S Leland, III
(74) *Attorney, Agent, or Firm* — Myers Bigel, P.A.

(57) ABSTRACT

A control method improves a user's ability to navigate in speech-containing audio data during playback of the audio data on a computing device. The control method is executed by a processor in the computing device and comprises operating (51) a media player on the computing device to play the audio data, detecting (52) a user-initiated time-shift command to step forward or backward in the audio data, and, after detecting the time-shift command at a current time in the audio data, identifying (55) a starting point of a sentence in the audio data and operating (56) the media player to play the audio data from the starting point.

19 Claims, 6 Drawing Sheets

(51) Int. Cl.
  *G10L 15/22* (2006.01)
  *G10L 15/26* (2006.01)
  *G10L 15/05* (2013.01)
  *G11B 27/10* (2006.01)
  *G11B 27/28* (2006.01)
  *G10L 17/00* (2013.01)
  *G10L 15/08* (2006.01)

(56) References Cited

U.S. PATENT DOCUMENTS

| | | | | |
|---|---|---|---|---|
| 8,392,183 | B2* | 3/2013 | Weber | G11B 27/28 |
| | | | | 700/94 |
| 8,990,200 | B1* | 3/2015 | Christensen | G06F 7/08 |
| | | | | 707/736 |
| 9,633,696 | B1* | 4/2017 | Miller | G11B 27/105 |
| 2007/0112562 | A1* | 5/2007 | Vainio | G11B 27/105 |
| | | | | 704/208 |
| 2007/0168864 | A1* | 7/2007 | Yamamoto | G06F 16/68 |
| | | | | 715/716 |
| 2008/0120091 | A1* | 5/2008 | Waibel | G06F 17/289 |
| | | | | 704/2 |
| 2019/0079918 | A1* | 3/2019 | Thorn | G10L 15/26 |

OTHER PUBLICATIONS

Best Universal Audiobook Apps: iPad/iPhone Apps AppGuide, Feb. 12, 2011, Retrieved from the Internet May 4, 2016, http://appadvice.com/applists/show/best-universal-audiobook-apps.

Vassil Panayotov et al., "Librispeech: an ASR Corpus Based on Public Domain Audio Books," 2015 IEEE International Conference on Acoustics, Speech and Signal Processing, Apr. 2, 2015, pp. 5206-5210.

Xavier Anguera Miro et al., "Speaker Diarization: A Review of Recent Research," IEEE Transactions on Audio, Speech and Language Processing, IEEE Service Center, vol. 20, No. 2, Feb. 2, 2012, pp. 356-370.

Read et al, "Sentence Boundary Detection: A Long Solved Problem," Proceedings of COLING 2012: Posters, pp. 985-994, 2012.

Jamil et al. Prosody-Based Sentence Boundary Detection of Spontaneous Speech, Fifth Conference on Intelligent Systems, Modelling and Simulation, pp. 311-317, 2014.

Arora et al., "Automatic Speech Recognition: A Review," International Journal of Computer Applications, 60(9):34-44, 2012.

Reynar, "Topic Segmentation: Algorithms and Applications," Dissertation in Computer and Information Science; Presented to the Faculties of the University of Pennsylvania in Partial Fulfillment of the Requirements for the Degree of Doctor of Philosophy, 1998.

Das and Martins, "A Survey on Automatic Text Summarization," Language Technologies Institute, Carnegie Mellon University, Nov. 21, 2017.

Margolis and Ostendorf, "Question Detection in Spoken Conversations Using Textual Conversations," Proceedings of the 49th Annual Meeting of the Association for Computational Linguistics: short papers, pp. 113-124, 2011.

Shriberg et al., Can Prosody Aid the Automatic classification of Dialog Acts in Conversational Speech? Language and Speech 41(34): 439487. Special Issue on Prosody and Conversation, 1998.

\* cited by examiner

CONTROLLING PLAYBACK OF SPEECH-CONTAINING AUDIO DATA

CROSS-REFERENCE TO RELATED APPLICATIONS

The present application is a 35 U.S.C. § 371 national phase application of PCT Application Serial No. PCT/EP2016/055626, filed Mar. 16, 2016, the disclosure of which is hereby incorporated herein in its entirety by reference.

TECHNICAL FIELD

The present invention relates generally to techniques for controlling playback of digital audio data, in particular such audio data containing spoken language.

BACKGROUND ART

In modern society, many persons have at least one digital device that includes a media player capable of playing digital audio files. Such digital devices include mobile phones, portable media players, tablet computers, laptop computers, personal computers, network speakers, car entertainment systems, home entertainment systems, etc.

Digital audio files containing speech have been gaining increasing popularity and are available for download or online streaming over the Internet. Such speech-containing audio files include so-called audio books or talking books, which are recordings of a literary text being read out loud, as well as so-called podcasts, which are episodic series of audio recordings.

The digital device normally has a command interface that allows the user of the digital device to control the playback of the audio file, e.g. by actuating dedicated buttons or icons in the command interface. For example, the user may pause and resume the playback of the audio file at will. Many command interfaces also allow the user to move forward or backward through the audio file at a speed faster than its normal playback speed, and to skip forward or backward in the audio file by a given time step, such as 15 seconds.

One problem when playing speech-containing audio files is that the current context may be lost to the listener if the playback is paused for a longer time. Some media players solve this problem by automatically rewinding the playback by a fixed time step, e.g. 15 or 30 seconds, when the user resumes playback of the audio file after a pause.

However, there is a continued need to improve the user's ability to control the playback of speech-containing audio files.

BRIEF SUMMARY

It is an objective of the invention to at least partly overcome one or more limitations of the prior art.

Another objective is to improve the ability of a user to navigate in speech-containing audio data during playback on a computing device.

A further objective is to improve the user's ability to perceive the current context of the speech-containing audio data when resuming playback of the audio data after a pause.

One or more of these objectives, as well as further objectives that may appear from the description below, are at least partly achieved by a method of controlling playback of speech-containing audio data on a computing device, a computer-readable medium, and a computing device for playback of speech-containing audio data, embodiments thereof being defined by the dependent claims.

A first aspect of the invention is a method of controlling playback of speech-containing audio data on a computing device comprising a processor. The method is executed by the processor in the computing device and comprises: operating a media player on the computing device to play the audio data; detecting a user-initiated time-shift command to step forward or backward in the audio data; and, after detecting the time-shift command at a current time in the audio data, identifying a starting point of a sentence in the audio data and operating the media player to play the audio data from the starting point.

The first aspect ensures that the playback of the speech-containing audio data on the computing device, after the user-initiated time-shift command, starts at the beginning of a sentence of spoken language in the audio data. This will improve the user's ability of navigating in the audio data on the computing device, since it allows the user to step forward or backward in the audio data while automatically skipping portions of silence, noise and music in the audio data.

The first aspect likewise makes it possible to automatically, after detecting the user-initiated time-shift command to step backward, rewind the playback of the audio data to the starting point of a sentence in the audio data. This will improve the user's ability to perceive the current context of the audio data when commanding the computing device to resume playback of the audio data after a pause. The first aspect also enables the media player to be operated to replay sentences that are selected to summarize the information content of a preceding time segment in the audio data.

The first aspect also enables further advanced forms of navigation that takes into account the context and structure of the speech in the audio data. For example, embodiments presented below make it possible for the user to step forward or backward in the audio data by sentence(s), by paragraph(s), by chapter(s), by speaker(s), by topic(s), etc.

In one embodiment, the starting point of the sentence is identified based on natural language processing of the audio data. The natural language processing may, but need not, be executed by the processor as part of the method of the first aspect. The natural language processing may comprise operating a sentence segmentation algorithm on the audio data. Alternatively or additionally, the natural language processing may comprise generating text corresponding to the audio data by operating a speech recognition algorithm on the audio data, and segmenting the text into sentences by operating a sentence segmentation algorithm on the text.

In one backward-step embodiment, the time-shift command indicates a step backward in the audio data, and wherein the starting point is identified as one of: a starting point of a set of consecutive sentences related to a current topic of the audio data at the current time; a starting point of a set of consecutive sentences with a predefined relation to the current time; a starting point of a set of consecutive sentences associated with a current speaker at the current time, or a set of consecutive sentences associated with another speaker immediately preceding the set of consecutive sentences associated with the current speaker; and a starting point of a set of sentences that provide a content summarization of a time segment in the audio data preceding the current time. In one example, the predefined relation is defined such that the set of consecutive sentences includes a most recently started sentence at the current time.

In one backward-step embodiment, at least one of the starting point, the number of consecutive sentences in the set of consecutive sentences, the number of sentences in the set of sentences, and the time segment is obtained as a function of a control variable comprising one or more of: a text complexity index at the current time, the text complexity index indicating a complexity of spoken language in the audio data at the current time; a category classification of the audio data; a duration of a pausing of the media player, if the time-shift command is triggered by the pausing; an occurrence rate of time-shifting commands at the current time in the audio data for a population of different users; and a user interaction with a command interface of the computing device, such as a duration of the user interaction with the command interface, a degree of pressure applied to the command interface, or a user selection of a command element among a plurality of command elements on the command interface.

In one forward-step embodiment, the time-shift command indicates a step forward in the audio data, and wherein the starting point is identified as one of: a starting point of a sentence related to a topic that differs from a current topic of the audio data at the current time; a starting point of a sentence with a predefined relation to the current time; and a starting point of a sentence associated with a speaker that differs from a current speaker at the current time. In one example, the predefined relation is given as a count of started sentences after the current time.

In one forward-step or backward-step embodiment, the method further comprises: allocating a respective topic identifier to sentences in the audio data; the method further comprising, for identifying the starting point: identifying the current topic by the topic identifier allocated to a most recently started sentence in the audio data at the current time, and searching among the topic identifiers based on the current topic to identify the starting point. The method may further comprise operating a topic segmentation algorithm on the text generated by the speech recognition algorithm to allocate the respective topic identifier to the sentences in the audio data.

In one forward-step or backward-step embodiment, the method further comprises: allocating a respective speaker identifier to sentences in the audio data; the method further comprising, for identifying the starting point: identifying the current speaker by the speaker identifier allocated to a most recently started sentence in the audio data, and searching among the speaker identifiers based on the current speaker to identify the starting point. Further, the method may comprise operating a voice recognition algorithm on the audio data to allocate the respective speaker identifier to the sentences in the audio data.

In one backward-step embodiment, the method further comprises: operating an automatic summarization algorithm on the text generated by the speech recognition algorithm, within the time segment in the audio data, to generate the content summarization.

In one forward-step or backward-step embodiment, the method further comprises: identifying starting times in the audio data for sentences of spoken language in the audio data, and storing the starting times in an electronic memory, which is accessible to the processor, the method further comprising, after detecting the time-shift command: searching the electronic memory, based on the current time and in view of the time-shift command, to identify the starting point among the starting times corresponding to sentences of spoken language in the audio data, and playing the audio data at the starting point so as to play one or more sentences following upon the starting point in the audio data. In one embodiment, the text comprises a sequence of words, and the words are stored in the electronic memory in association with a respective time point, and the sentence segmentation algorithm is operated on the words, before or during playback of the audio data, to segment the words into the sentences and identify the starting times.

In one forward-step or backward-step embodiment, the time-shift command is detected by detecting a user interaction with a dedicated control element in a command interface of the computer device.

In one backward-step embodiment, the time-shift command indicates a step backward in the audio data and is detected by detecting an instruction to pause the playback of the audio data.

A second aspect of the invention is a computer-readable medium comprising computer instructions which, when executed by a processor, cause the processor to perform the method of the second aspect or any of its embodiments.

A third aspect of the invention is a computing device for playback of speech-containing audio data. The computing device is configured to: operate a media player on the computing device to play the audio data; detect a user-initiated time-shift command to step forward or backward in the audio data; and, after detecting the time-shift command at a current time in the audio data, identify a starting point of a sentence in the audio data and operate the media player to play the audio data from the starting point.

The computing device of the third aspect may alternatively be defined to comprise: Means for operating a media player on the computing device to play the audio data; means for detecting a user-initiated time-shift command to step forward or backward in the audio data; means for identifying, after detecting the time-shift command at a current time in the audio data, a starting point of a sentence in the audio data; and means for operating the media player to play the audio data from the starting point.

The second and third aspects share the advantages of the first aspect. Any one of the above-identified embodiments of the first aspect may be adapted and implemented as an embodiment of the second and third aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Embodiments of the invention are directed to techniques for improving the user experience when operating a media player on a computing device for playback of speech-containing audio data, and specifically by enabling a contextual time-shifting of the playback of the audio data. As used herein, a "time-shifting" of the playback results in a step forward or backward in the audio data, i.e. the playback of the audio data is shifted either forward or backward in time in relation to a current time point in the audio data. The "contextual time-shifting" takes into account the structure and possibly the meaning of the spoken language in the audio data at and around a current time, when determining the magnitude of the time-shifting. On a general level, the contextual time-shifting is achieved by identifying sentences of spoken language in the audio data and shifting the playback to the starting point of one of the sentences in the audio data. The selection of the starting point may be based on different criteria, as will described in more detail below.

Before describing embodiments of the invention in more detail, a few further definitions will be given.

As used herein, "audio data" designates audio signals that have been encoded in digital form in any audio coding format and may be uncompressed or compressed, as is well-known in the art. The audio data may be provided to the computing device as a bitstream in an audio coding format or as embedded in a file with a defined storage layer. Such audio formats include but are not limited to WAV, AIFF, AU, RAW Audio, FLAC, WavPack, Monkey's Audio, ALAC, MPEG-4 SLS, MPEG-4 ALS, MPEG-4 DST, WMA Lossless, Shorten, Opus, MP3, Vorbis, Musepack, AAC, ATRAC, WMA lossy, etc.

As used herein, a "media player" is a computer program operable to play digital media data, including but not limited to audio data.

As used herein, "speech" relates to the vocalized form of human communication which is based upon a syntactic combination of words. Each spoken word is created out of a phonetic combination of a limited set of vowel and consonant speech sound units generated by speech organs of a human body.

As used herein, "speech-containing audio data" is any form of audio data that contains speech and is capable of being stored, fully or partly, in an electronic memory. This type of audio data includes but is not limited to audiobooks, podcasts, radio transmissions including radio drama, as well as audio tracks for movies, television transmissions, video games, etc.

As used herein, "natural language processing" (NLP) is given its ordinary meaning and refers to computer-based techniques for processing natural languages, i.e. languages that develop naturally in humans through use and repetition without any conscious planning or premeditation of their own. NLP includes but is not limited to computer algorithms and techniques for word and sentence tokenization, text classification and sentiment analysis, spelling correction, information extraction, parsing, text mining, question answering, and automatic summarization.

As used herein, "speech recognition" (SR) is given its ordinary meaning and designates NLP algorithms or techniques for recognition and translation of spoken language into computer-readable text. SR is also known as "automatic speech recognition" (ASR), "computer speech recognition", or "speech to text" (STT). Many algorithms are known in the art, e.g. as presented in the article "Automatic Speech Recognition: A Review", by Arora et al, published in International Journal of Computer Applications, 60(9):34-44, 2012, and references cited therein. Speech recognition results in an ordered sequence of text items, typically words.

As used herein, "sentence segmentation" is given its ordinary meaning and designates NLP algorithms or techniques for dividing, by a computer program, speech or text into its component sentences. Sentence segmentation is also denoted sentence tokenization, sentence boundary detection and sentence splitting. Sentence segmentation algorithms may operate on text (linguistic-based algorithms) and/or audio (acoustic-based algorithms). Algorithms that operate on audio may derive and analyze one or more prosodic variables of speech, such as pause, pitch, duration, loudness and timbre. Many linguistic-based and acoustic-based algorithms are known in the art, e.g. as described in the articles "Sentence Boundary Detection: A Long Solved Problem?", by Read et al, published in Proceedings of COLING 2012: Posters, pp 985-994, 2012, and "Prosody-Based Sentence Boundary Detection of Spontaneous Speech", by Jamil et al, published in Fifth International Conference on Intelligent Systems, Modelling and Simulation, pp 311-317, 2014, and references cited therein.

As used herein, the meaning of "sentence" is inherently linked to the sentence segmentation algorithm, i.e. a sentence is defined as a text unit produced by the sentence segmentation algorithm. This text unit is thus an apparent sentence identified by the algorithm. Depending on implementation of the sentence segmentation algorithm, the text unit may e.g. be a linguistic unit consisting of one or more words that are grammatically linked, a clause with subject and predicate, an utterance, or words grouped meaningfully to express a statement, question, exclamation, request, command or suggestion, etc.

As used herein, "topic segmentation" is given its ordinary meaning and designates NLP algorithms and techniques for, by a computer program, analyzing a text portion containing multiple topics, and discovering these topics automatically. As used herein, the term "topic" is given its common meaning in linguistics. Thus, the topic of a sentence is what is being talked about. In the field of linguistics, topic is also denoted theme. Many topic segmentation algorithms are known in the art, e.g. as presented in the dissertation "Topic Segmentation: Algorithms and Applications" by Reynar, 1998, and references cited therein.

As used herein, "automatic summarization" is given its ordinary meaning and designates NLP algorithms and techniques for automatically reducing, by a computer program, a text portion in order to create a summary that retains the most important points of the text portion. These algorithms and techniques may take into account variables such as length, writing style and syntax. The goal of the automatic summarization as used herein is to find a representative subset of the text portion, specifically to select sentences from the text portion to create a short paragraph summary that contains the information of the entire text portion. Many algorithms are known in the art, e.g. as presented in the article "A survey on Automatic Text Summarization", by Das and Martins, Language Technologies Institute, Carnegie Mellon University, 21 Nov. 2007, and references cited therein.

As used herein, "voice recognition" is given its ordinary meaning and denotes computer-based algorithms and techniques for discriminating between different speakers based on characteristics of voices (voice biometrics). It is also known as speaker recognition and speaker diarization. Many algorithms are known in the art, e.g. as presented in the article "Speaker diarization: A review of recent research", by Anguera et al, published in IEEE Transactions On Acoustics Speech and Language Processing (TASLP), pp 1-15, 2010, and references cited therein.

As used herein, "question detection" is given its ordinary meaning and denotes computer-based algorithms and techniques for identifying questions in text or audio. When operating on text, algorithms may e.g. search for interrogatives. When operating on audio, algorithms may e.g. extract and analyze one or more prosodic variables of speech. Many algorithms are known in the art, e.g. as described in the articles "Question Detection in Spoken Conversations Using Textual Conversations", by Margolis and Ostendorf, published in Proceedings of the 49th Annual Meeting of the Association for Computational Linguistics: short papers, pp 118-124, 2011, and "Can Prosody Aid the Automatic Classification of Dialog Acts in Conversational Speech?", by Shriberg et al, published in Language and Speech, 41(34): 439-487, 1998, and references cited therein.

As used herein, "readability test" is given its ordinary meaning and denotes computer-based algorithms and techniques for evaluating readability of text, e.g. by counting syllables, words and sentences, and optionally by also accounting for syntactic or semantic complexity.

Figure 1:
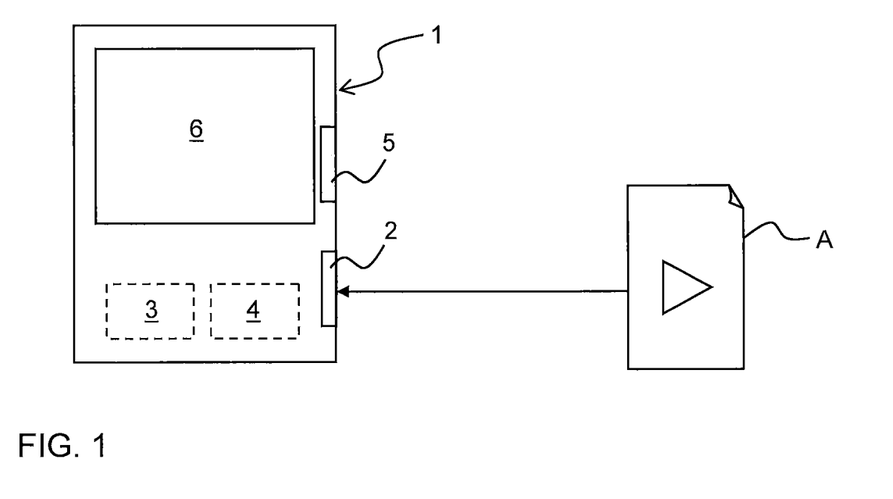
FIG. 1 is a schematic view of a computing device for playing audio data.

FIG. 1 illustrates a computing device 1 which is configured to receive and play audio data A. In FIG. 1, the audio data A is illustrated as a file and will be denoted "audio file" in the following. The computing device 1 receives the audio file A via a data interface 2. The data interface 2 may be a wireless interface for wireless connection to an external device that stores the audio file A, or a port for physical interconnection with such an external device, optionally by wire.

The computing device 1 further comprises a processor 3 and electronic memory 4. The memory 4 stores a computer program ("media player program") which, when executed by the processor 3, causes the computing device 1 to operate as a media player. The media player is operable to play the audio file A, by causing the computing device 1 to provide a corresponding electrical signal to an audio output unit 5. The audio output unit 5 may be a loudspeaker, an audio socket or a wireless transmitter.

The audio file A is typically transferred to the computing device 1 for local storage in the memory 4. For example, a complete audio file may be transferred and stored in the memory 4 in advance of playback. Alternatively, the transfer may be effected during playback, e.g. by so-called progressive downloading. However, it is also conceivable that the audio file A is transferred from the external device to the computing device 1 without local storage in the memory 4. In one such example, the external device is a portable memory, such as a flash drive, which stores the audio file A. When the portable memory is connected to the data interface 2, the processor 3 accesses the audio file A from the portable memory and instantiates the media player to play the audio file A directly from the portable memory.

The computing device 1 further comprises a user interface or command interface 6 with dedicated control elements for controlling the computing device 1, including the operation of the media player. The command interface 6 may be fixed, where the control elements are mechanical buttons permanently assigned a respective control function for the media player. Alternatively or additionally, the command interface 6 may be dynamic, where the control elements are graphical elements or icons that are displayed on a screen for selection by the user, e.g. by the user touching the screen or by the user operating a track pad or mouse.

Figure 2:
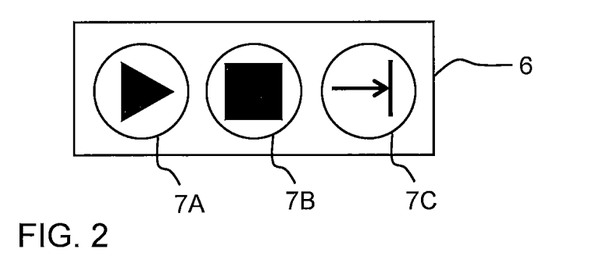
FIG. 2 shows a first example of a command interface of the computing device in FIG. 1.

FIG. 2 shows a first example of a command interface 6 for controlling the media player. The command interface 6 may be either fixed or dynamic and includes a control element 7A ("start element") for starting playback of the audio file A, a control element 7B ("pause element") for pausing the playback, and a control element 7C ("skip forward element") for time-shifting the playback in a forward direction in the audio file A.

Figure 3A:
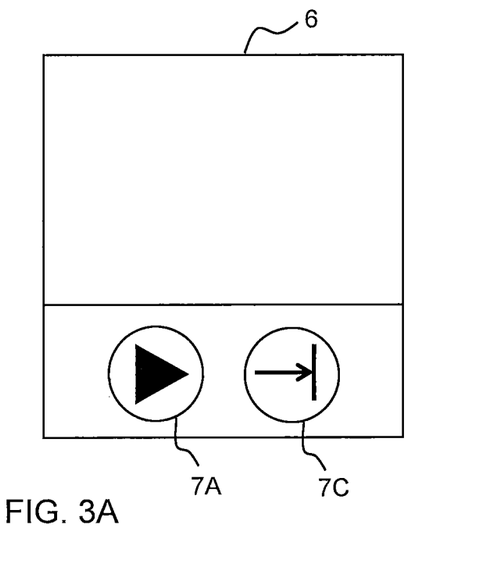
FIGS. 3A-3B show a second example of a command interface of the computing device in FIG. 1.
Figure 3B:
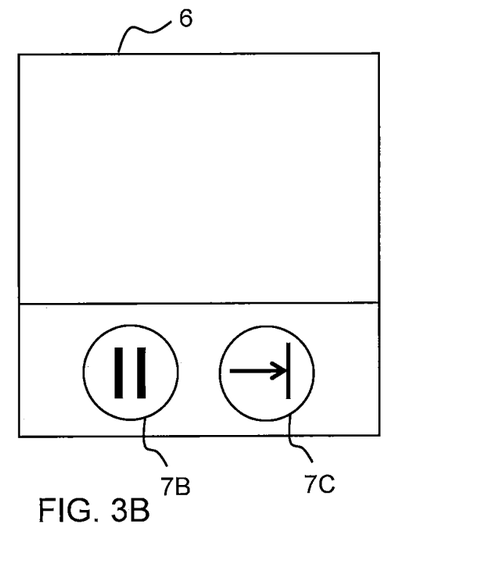

FIGS. 3A-3B show a second example of a command interface 6 for controlling the media player. The command interface 6 is dynamic, and the layout of the control elements 7A-7C is changed depending on the operating state of the media player. Specifically, as shown in FIG. 3A, when playback is stopped/paused, the command interface 6 includes a control element 7A for starting playback and a control element 7C for skipping forward. During playback, the command interface 6 instead includes a control element 7B for pausing playback and the control element 7C for skipping forward.

Embodiments of the invention involve a control program for controlling the playback of the audio file A by the media player. The control program may be part of or separate from the media player program. The control program is responsive to commands entered via the command interface 6 to operate the media player. In one embodiment, the control program infers a command to step backward in the audio file A by detecting a command to pause playback of the audio file A. Thus, the computing device 1 will automatically rewind the playback of the audio file A when the user actuates the start element 7B after having actuated the pause element 7A in FIGS. 2-3. In another embodiment, the control program infers a command to step forward in the audio file by detecting that the user actuates the skip forward element 7C.

It should be emphasized that FIGS. 2-3 are merely given as examples and that the command interface 6 may have other configurations and/or include other or further control elements. For example, the command interface 6 may include a dedicated control element ("skip backward element") for time-shifting the playback in a backward direction in the audio file A. Thus, the control program may infer a command to step backward in the audio file A by detecting that the user actuates such a skip backward element.

The computing device 1 may be any type of apparatus capable of executing a media player program for playback of an audio file A, including but not limited to a mobile phone, a personal computer, a laptop computer, a tablet computer, a pocket computer, a network speaker, a home entertainment system, a car entertainment system, a game controller, etc.

Figure 4:
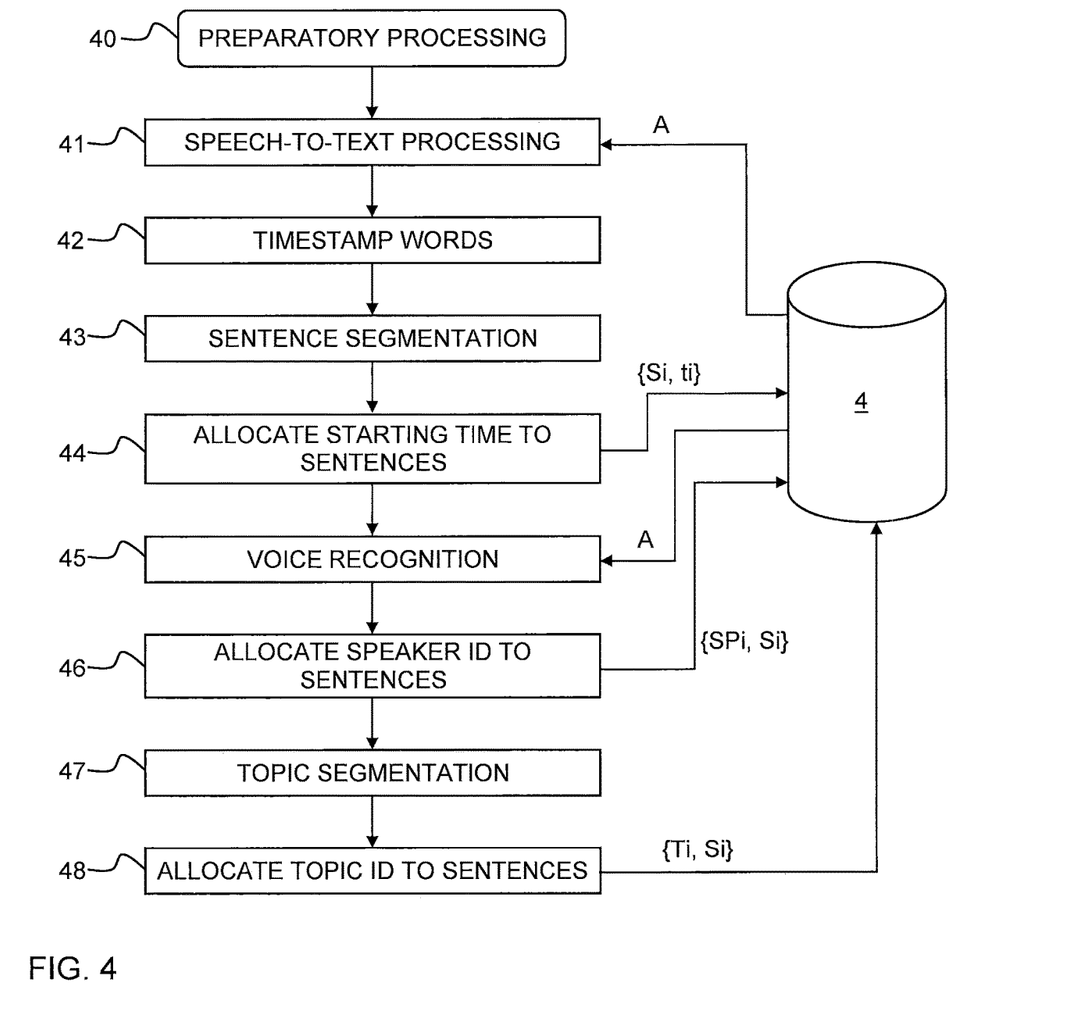
FIG. 4 is a flow chart of method for preparatory processing of audio data.
Figure 5:
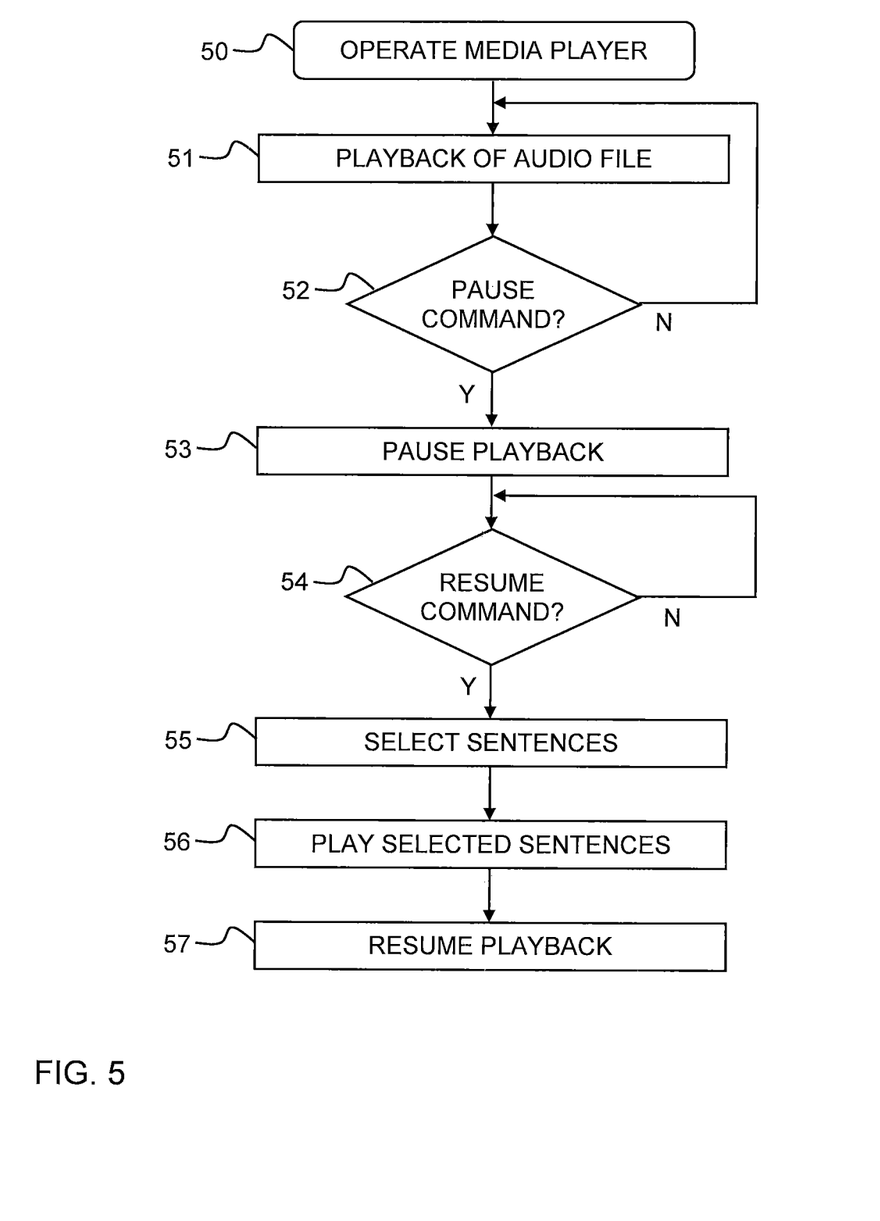
FIG. 5 is a flow chart of a method of operating a media player on the computing device in FIG. 1 according to an embodiment of the invention.
Figure 6:
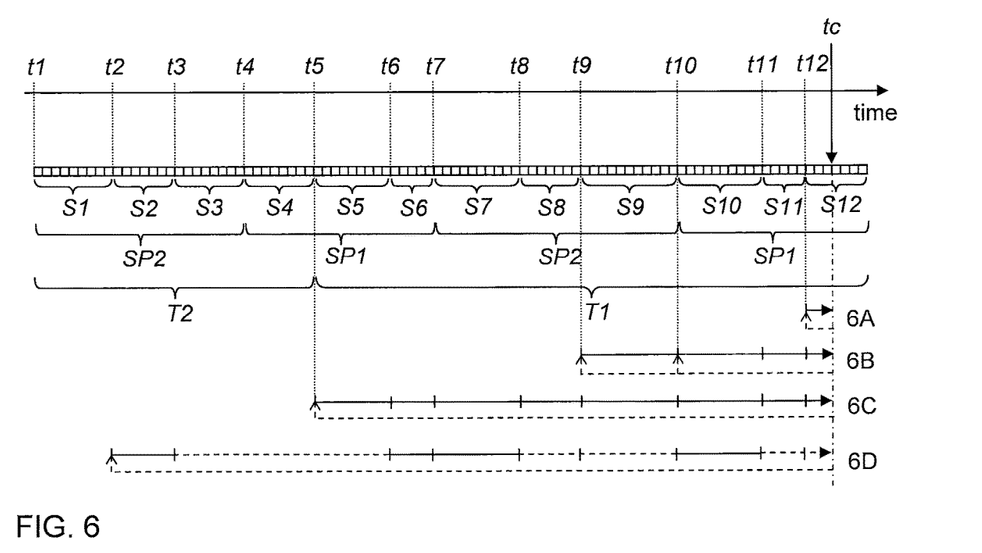
FIG. 6 is a schematic illustration of the method in FIG. 5 applied to a time sequence of words and sentences in an audio file.
Figure 7:
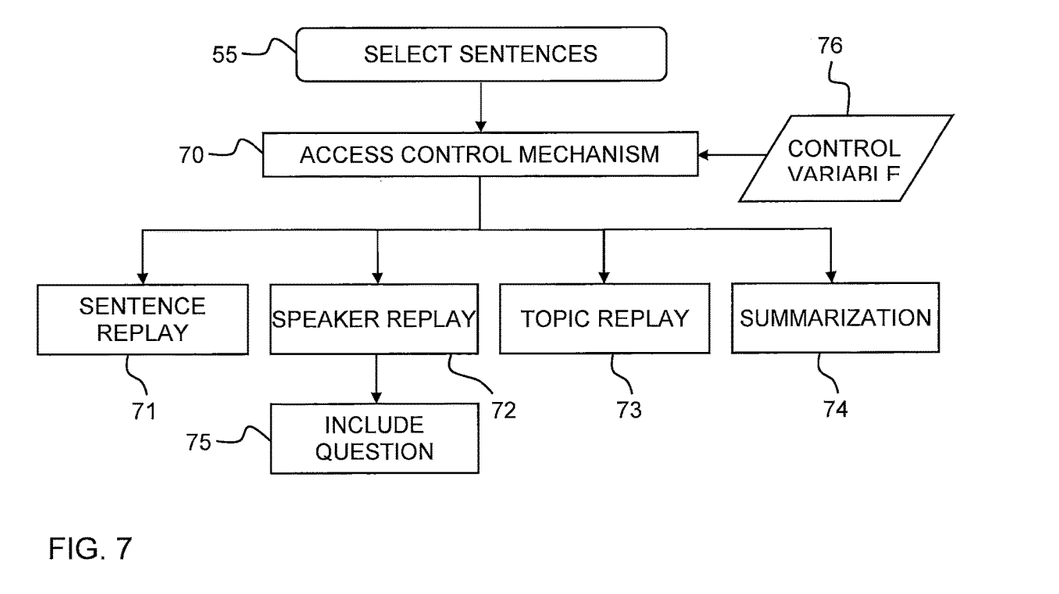
FIG. 7 illustrates a step of selecting sentences in the method of FIG. 5.
Figure 8:
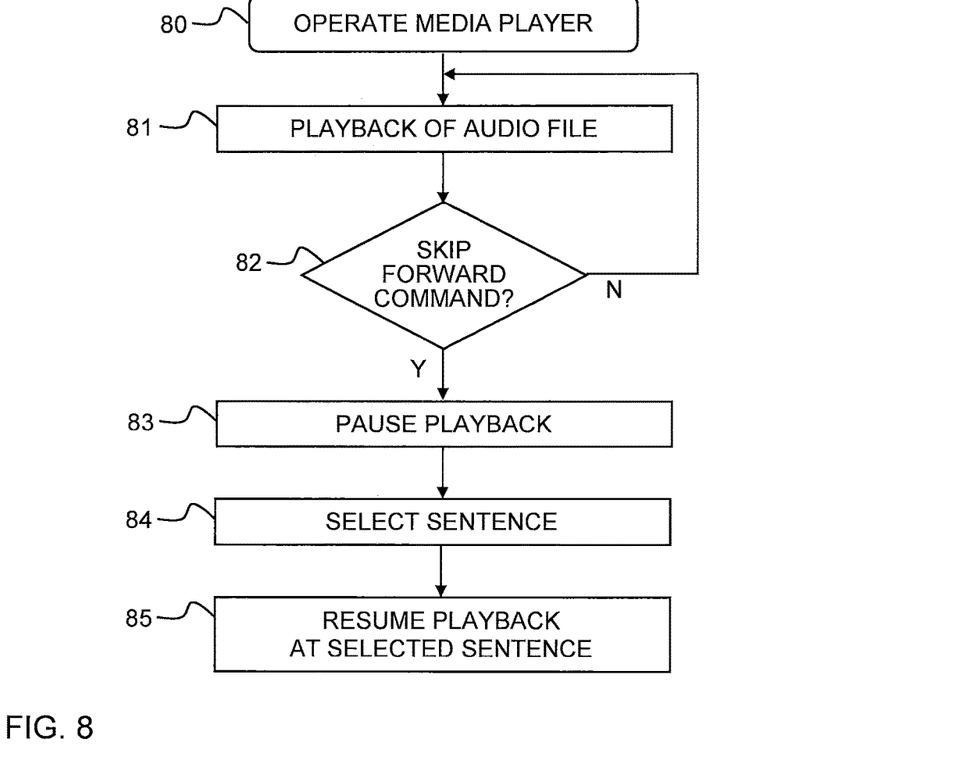
FIG. 8 is a flow chart of a method of operating the media player on the computing device in FIG. 1 according to another embodiment of the invention.
Figure 9:
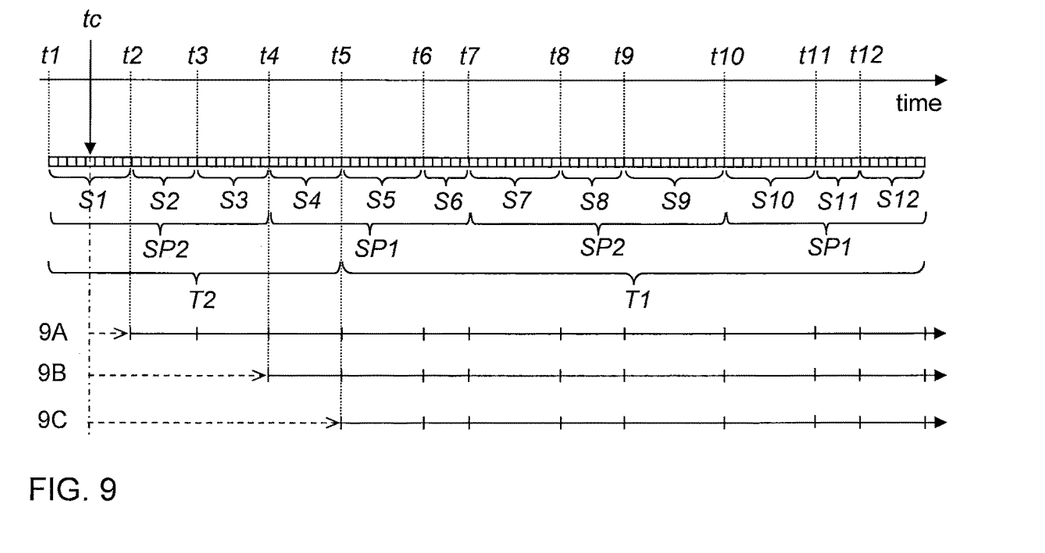
FIG. 9 is a schematic illustration of the method in FIG. 8 applied to a time sequence of words and sentences in an audio file.

In the following, embodiments of the invention will be exemplified in relation to FIGS. 4-9, where FIG. 4 illustrates a method of preparatory processing of the audio file A, FIGS. 5-7 illustrate a method of stepping backward in the audio file A based on the output of the preparatory processing, and FIGS. 8-9 illustrate a method of stepping forward in the audio file A based on the output of the preparatory processing.

In the example of FIG. 4, the preparatory processing 40 is executed by the processor 3 and is operated on the entire audio file A in advance of playback, to generate contextual data for the audio file. The preparatory processing 40 may operate in relation to the memory 4 of the computing device 1, as shown in FIG. 4, and/or in relation to an external memory (not shown) which is accessible to the computing device 1, e.g. a memory in the above-mentioned external device. In a further alternative, the preparatory processing 40 is executed separately from the computing device 1 and the resulting contextual data is then transferred to the computing device 1, e.g. as metadata in the audio file A, or in a separate data file. Further alternatives of the preparatory processing 40 are discussed below with reference to FIG. 5.

The preparatory processing 40 in FIG. 4 aims at identifying individual sentences and associated starting times in the audio file A, as well as to discriminate between different speakers and topics in the audio file A.

In step 41, the audio file A is retrieved from memory 4 and subjected to speech-to-text processing by operating a speech recognition algorithm on the audio file A. The output of step 41 is a time-sequence of words. In step 42, the words are time-stamped so as to associate the respective word with a time point in the time frame of the audio file A. Although not shown in FIG. 4, the time-stamped words may be stored in memory 4. In step 43, a sentence segmentation algorithm is operated on the time-stamped words to identify individual sentences Si. Step 44 allocates a starting time ti to the respective sentence Si. The starting time ti may be given as a function of the time stamp of the first word in the respective sentence Si. Depending on implementation, step 44 may also allocate an end time to the respective sentence Si, given as a function of the time stamp of the last word in the respective sentence Si. Step 44 also stores an association between sentences and starting times (and optionally end times) in a database in memory 4. The association may be implicit or explicit. It should be noted that step 44 need not store the sentences as such in memory 4.

In step 45, the audio file A is retrieved from memory 4 and a voice recognition algorithm is operated on the audio file A to discriminate between different speakers. Step 45 may produce a speaker ID for respective time segments in the audio file, where each different speaker IDs represent different speakers. Step 46 processes the output of the voice recognition algorithm, e.g. by matching the time segments to the starting and end times of the sentences, and allocates a speaker ID to each sentence. Step 46 also stores the association between sentence and speaker ID (indicated by SPi in FIG. 4) in the database in memory 4.

In step 47, a topic segmentation algorithm is operated on the time-stamped words generated by steps 31-32, optionally organized into the sentences identified by step 33, to discriminate between different topics in the audio file A. Step 48 processes the output of the topic segmentation algorithm and allocates a topic ID to each sentence. Step 48 also stores the association between sentence and topic ID (indicated by Ti in FIG. 4) in the database in memory 4.

After completion of steps 41-48, the database in memory 4 contains the contextual data which is used by the control program when operating the media player to play the audio file A on the computing device 1. This contextual data is schematically depicted in the top portion of FIG. 6, in relation to a sequence of words, each represented by a small square, arranged along a time line of the audio file. The words are grouped into sentences, designated by S1-S12. Each sentence is allocated a respective starting time, designated by t1-t12. The sentences are in turn associated with a respective speaker, designated by SP1 and SP2, and a respective topic, designated by T1 and T2.

It should be understood that the steps of the preparatory processing 40 need not be executed in the particular order shown in FIG. 4. Further, one or more steps may be excluded if the resulting data is not needed for controlling the media player. For example, steps 45-46 may be excluded if speaker ID is not used, and steps 47-48 may be excluded if topic ID is not used. Other variations are also possible. For example, steps 41-43 may be replaced by a step that processes the audio file A to identify pauses, i.e. time periods without spoken language, and analyzes the pauses to identify individual sentences. The thus-identified sentences are then allocated a respective starting time (and optionally an end time) by step 44. In a further alternative, sentences are identified by a combination of speech-to-text processing and analysis of the audio file A.

It is also conceivable that the preparatory processing 40 is configured to identify further contextual data in the audio file A. For example, if the audio file A is an audio book, the preparatory processing 40 may identify paragraphs and/or chapters in the audio file A, optionally by matching the time-stamped words produced by step 42 to the manuscript of the audio book.

FIG. 5 is a flow chart of a method 50 for controlling a media player to step backward when playing the audio file A. In the example of FIG. 5, the playback control method 50 comprises steps 51-57 and is executed by the processor 3 based on the contextual data generated by the preparatory processing 40 in FIG. 4. In step 51, the media player is operated to play the audio file A, until step 52 detects a command to pause the playback. This command may be generated by the user actuating (e.g. pressing or touching) the pause element 7B in FIGS. 2-3. When such a pause command is detected, step 53 pauses the playback at a current time in the audio file. The playback then remains paused until step 54 detects a command to resume playback. This command may be generated by the user actuating the start element 7A in FIGS. 2-3. When such a resume command is detected, step 55 accesses the contextual data to select one or more sentences. The one or more sentences are selected by identifying, among the starting times for sentences in the contextual data, a starting point that falls before the current time. Then, step 56 operates the media player to play the audio file from the starting point, so as to play the selected sentence(s), whereupon step 57 resumes playback of the audio file at the current time.

Step 56 may operate the media player to play all sentences located between the starting point and the current time. However, it is conceivable that step 55 also identifies an end point associated with the starting point, and step 56 operates the media player to play the audio file between the starting point and the end point. Step 55 may also identify a plurality of pairs of starting and end points, and step 56 may operate the media player to play the audio file between each pair of starting and end points.

Step 55 may be implemented in many different ways to identify the starting point(s) (and optionally a respective end point), and thus to select the one or more sentences to be played by step 56. A few examples are presented in FIG. 7. As seen in FIG. 7, step 55 may include a step 70 of accessing a control mechanism or control logic which defines how the sentence(s) are to be selected. In the example of FIG. 7, the control mechanism has four main options for selecting the sentences: sentence replay 71, speaker replay 72, topic replay 73 and summarization replay 74.

In sentence replay 71, the starting point is selected to define a set of consecutive sentences with a given relation to the current time. As used herein, "consecutive sentences" refers to a contiguous time-sequence of sentences in the audio file, i.e. sentences that follow upon one another over time, and "a set of consecutive sentences" may include any number of sentences, including a single sentence. In one example, the set of consecutive sentences is selected to include the current sentence. The "current sentence" is the most recently started sentence in the audio file at the current time. Thus, the current sentence may be either ongoing or completed at the current time. In one embodiment, the sentence replay 71 identifies the starting point in the contextual data by counting a number of starting times back from the current time tc. The sentence replay 71 is further illustrated in FIG. 6, in which the audio file is paused at a current time tc during sentence S12. The sentence replay 71 is represented by use case 6A, in which the starting point is selected as the most recent starting time t12 before the current time tc. Thus, as indicated by the combination of a dashed arrow and a solid arrow in FIG. 6, the sentence replay 71 may effectively cause the media player to replay the current sentence. It should be noted that the sentence replay 71 could step any number of sentences back from the current time tc.

It is also conceivable that the sentence replay 74 selects the starting point at the starting time of a paragraph or chapter in the audio file.

In another example, the sentence replay 71 may be configured to select the starting point based on another digital medium associated with or included in the audio file A, e.g. a visual medium such as a presentation. For example, the sentence replay 71 may select the starting point by matching the time point of a slide change in the presentation to the starting times in the contextual data.

In speaker replay 72, the starting point is selected as the starting time of a set of consecutive sentences associated with the current speaker. The current speaker is given by the speaker ID of the current sentence. In one embodiment, the speaker replay 72 searches the contextual data, based on speaker ID, to identify the most recent switch of speaker, and selects the starting point as the starting time of a sentence spoken by the current speaker after this switch. According to use case 6B in FIG. 6, the speaker replay 72 selects the starting time t10. Thus, in the example of FIG. 6, the speaker replay 72 effectively causes the media player to replay all of the latest sentences spoken by the current speaker.

In a variant, shown in FIG. 7, the speaker replay 72 involves the further step 75 of selecting the starting point as the starting time of a set of consecutive sentences preceding the switch of speaker, if this set of consecutive sentences is found to include a question. In the example of FIG. 6, assuming that sentence S9 is a question, step 75 will select the starting time t9, as also shown by use case 6B. The provision of step 75 presumes that the preparatory processing 40 (FIG. 4) involves steps of identifying questions in the audio file and including a corresponding identifier in the contextual data. Questions may be identified by operating an automatic question detection algorithm on the audio file A or the text generated by steps 41-42.

In topic replay 73, the starting point is selected as the starting time of a set of consecutive sentences associated with the current topic. The current topic is given by the topic ID of the current sentence. In one embodiment, the topic replay 73 searches the contextual data, based on topic ID, to identify the most recent switch of topic, and selects the starting point as the starting time of a sentence associated with the current topic after this switch. According to use case 6C in FIG. 6, the topic replay 75 selects the starting time t5. Thus, in the example of FIG. 6, the topic replay 73 effectively causes the media player to replay all of the latest sentences related to the current topic.

In summarization replay 74, an automatic summarization algorithm is operated on the time-stamped words generated by steps 41-42, optionally organized into the sentences identified by step 43, within a time segment of the audio file. The time segment may be defined as an actual time period in the audio file, or as a specified number of words or sentences before the current time. The automatic summarization algorithm selects a number of sentences to represent the information in the time segment. The sentences need not, but may, be consecutive. The summarization replay 74 then provides the starting times (and optionally end times) of the identified sentences to step 56. According to use case 6D in FIG. 6, the summarization replay 74 selects sentences S2, S6, S7 and S10, which are played by step 56.

The control mechanism of step 70 may be configurable by the user, e.g. via the command interface 6 of the computing device 1. For example, the user may set the control mechanism to use one of the main options 71-74. The user may also be given the option to define operating parameters of the respective option 71-74. Such operating parameters may include the number of consecutive sentences to be selected by main options 71-73, if questions are to be included in main option 72, the length of the time segment used by main option 74, and a maximum number of sentences to be selected by main option 74.

Alternatively, the control mechanism of step 70 may be configured, by the user or by default, to automatically switch between two or more of the main options 71-74 and/or to automatically modify one or more of the operating parameters, based on a control variable 76 derived while the playback is paused.

In one embodiment, the control variable 76 is a text complexity index at the current time, where the text complexity index indicates the complexity of spoken language in the audio file A at the current time tc. The text complexity index may be generated by operating a readability test algorithm on the time-stamped words generated by steps 41-42, optionally organized into the sentences identified by step 43, within a time segment of the audio file. The time segment may extend backward and/or forward in the audio file A from the current time tc. The control mechanism of step 70 may be configured to automatically increase the number of sentences selected by step 55 with increasing text complexity index. In a further variant, the control mechanism may be configured to switch between the main options 71-74 based on the text complexity index.

In another embodiment, the control variable 76 is a category classification of the audio file A. The category classification may be given by metadata in the audio file A or by separate data and may indicate one of a plurality of categories, such as comedy, documentary, radio episode, audio book, etc. In one example, the control mechanism of step 70 prevents the use of main option 74 if the category is comedy. In another example, the control mechanism configures or enables main option 71 to step by paragraphs or chapters if the category is audio book.

In another embodiment, the control variable 76 is given by the time spacing between the pause command (step 52 in FIG. 5) and the subsequent resume command (step 54 in FIG. 5), i.e. the duration of the playback pause. The control mechanism of step 70 may be configured to increase the number of sentences selected by step 55 with increasing pause duration. In a further variant, the control mechanism may be configured to switch between the main options 71-74 based on the pause duration.

In another embodiment, the control variable 76 is given by statistical data that indicates an occurrence rate of pause commands at the current time in the audio file for a population of different users. If the occurrence rate is large, this may indicate that the spoken language in the audio file A at and before the current time may be particularly relevant/difficult/interesting to users. The control mechanism may be configured to modify the number of sentences selected by step 55 and/or switch between the main options 71-74, based on the occurrence rate. The statistical data may be obtained from metadata in the audio file A or from a separate file.

In another embodiment, the control variable 76 represents user interaction with the command interface 6, and the control mechanism may be configured to modify the number of sentences selected by step 55 and/or switch between the main options 71-74 based on the user interaction. For example, the user may thereby be given the ability to affect the control mechanism of step 70 by modifying the duration of the user's actuation of a control element (e.g. the play element 7A), by modifying the amount of pressure applied to the control element or by selecting among different control elements in the command interface 6.

It is to be understood that any combination of the foregoing control variables 76 may be used to modify the control mechanism of step 70. It is also to be understood that the control program need not implement all of the main options 71-74. Further, the control mechanism of step 70 may be omitted.

Reverting to FIG. 5, it should be noted that step 55 may instead be executed intermediate steps 53 and 54. However, if the control mechanism (step 70) is to be modified based on pause duration, at least part of step 55 needs to be executed after step 54. It should also be mentioned that, in all embodiments herein, the preparatory processing 40 need not be completed in advance of playing the audio file. Instead, the preparatory processing 40 may be executed during playback of the audio file, e.g. after detecting the pause command in step 52 or the resume command in step 54. In such an implementation, the preparatory processing 40 does not operate on the entire audio file A but operates on audio data that falls within a predefined time period which includes the current time. Thus, the preparatory processing 40 generates contextual data on demand and for this predefined time period only. In another variant, part of the preparatory processing 40 is executed in advance of playback, while other parts are executed on demand. For example, steps 41-42 may be executed in advance of playback to generate time-stamped words, which are then stored in memory 4, whereas steps 43-48 are executed on demand. Thus, in this example, sentences and associated starting times are identified on demand by processing a subset of the time-stamped words that are stored in memory 4.

FIG. 8 is a flow chart of a method 80 for controlling a media player to step forward when playing an audio file A. In the example of FIG. 8, the method 80 comprises steps 81-85 and is executed by the processor 3 based on the contextual data generated by the preparatory processing 40 in FIG. 4. In step 81, the media player is operated to play the audio file A, until step 82 detects a command to skip forward in the audio file A. This command may be generated by the user actuating (e.g. pressing or touching) the skip forward element 7C in FIGS. 2-3. When such a skip forward command is detected, step 83 pauses the playback at a current time in the audio file A, and step 84 accesses the contextual data to select a sentence. The sentence is selected by identifying, among the starting times in the contextual data, a starting point that falls after the current time. Step 85 then resumes playback at the starting point, thereby skipping forward the playback of the audio file A.

Step 84 may be implemented in analogy with step 55 in FIG. 5 to skip forward by sentence, by speaker or by topic. The different techniques of skipping forward will be further illustrated in FIG. 9, which corresponds to FIG. 6 and illustrates contextual data of an audio file paused at a current time tc during sentence S1.

When skipping forward by sentence, the starting point is selected to have a given relation to the current time, e.g. in terms of a count of sentences, paragraphs or chapters. In one example, step 84 identifies the starting point in the contextual data by counting a given number of starting times forward from the current time tc. The skipping forward by sentence is exemplified by use case 9A, in which the starting point is selected as the first starting time t2 after the current time tc. Thus, as indicated by a dashed arrow in FIG. 9, the skip forward command may effectively cause the media player to jump from the current time to the next sentence in the audio file.

When skipping forward by speaker, the starting point may be selected to identify a sentence associated with a speaker that differs from the current speaker, e.g. the next sentence spoken by another speaker than the current speaker. In one implementation example, step 84 searches the contextual data, based on speaker ID, to identify the first switch of speaker, and selects the starting point as the starting time of the first sentence after this switch. The skipping forward by speaker is exemplified by use case 9B in FIG. 9, in which the starting point is selected as the starting time t4 and the media player is controlled to jump to the first sentence spoken by another speaker. In an alternative embodiment, the starting point is selected to identify the first sentence spoken by the current speaker after a switch of speaker. In the context of FIG. 9, the starting point would be selected as the starting time t7 and the media player is controlled to jump to the next block of sentences spoken by the current speaker. In a further alternative embodiment, the starting point is selected to identify the starting time of the next n:th sentence spoken by the current speaker after the current time, with n being any positive number. In the context of FIG. 9 and with n being 4, the starting point would be selected as the starting time t8.

When skipping forward by topic, the starting point may be selected to identify a sentence associated with a topic that differs from the current topic, e.g. the next sentence associated with another topic than the current topic. In one implementation example, step 84 searches the contextual data, based on topic ID, to identify the first switch of topic, and selects the starting point as the starting time of the first sentence after this switch. The skipping forward by topic is exemplified by use case 9C in FIG. 9, in which the starting point is selected as the starting time t5 and the media player is controlled to jump to the first sentence associated with another topic.

Step 84 may include a step of accessing a control mechanism or control logic which defines how the sentence is to be selected, in analogy with the control mechanism described with reference to FIG. 7. The control mechanism may be configurable by the user, e.g. via the command interface 6 of the computing device 1. For example, the user may set the control mechanism to skip forward by sentence, speaker or topic. The user may also be given the option to define operating parameters, such a number of sentences, speakers or topics to be skipped. Alternatively, the control mechanism may be configured, by the user or by default, to switch between skipping forward by sentence, speaker and topic and/or to automatically modify one or more of the operating parameters, based on user interaction with the command interface 6. For example, the user may be given the ability to affect the control mechanism by modifying the duration of the user's actuation of a control element (e.g. the skip forward element 7C), by modifying the amount of pressure applied to the control element or by selecting among different control elements in the command interface 6.

It is to be understood that the control program need not implement all options of skipping forward by sentence, speaker and topic. Further, the control mechanism may be omitted.

Figure 10:
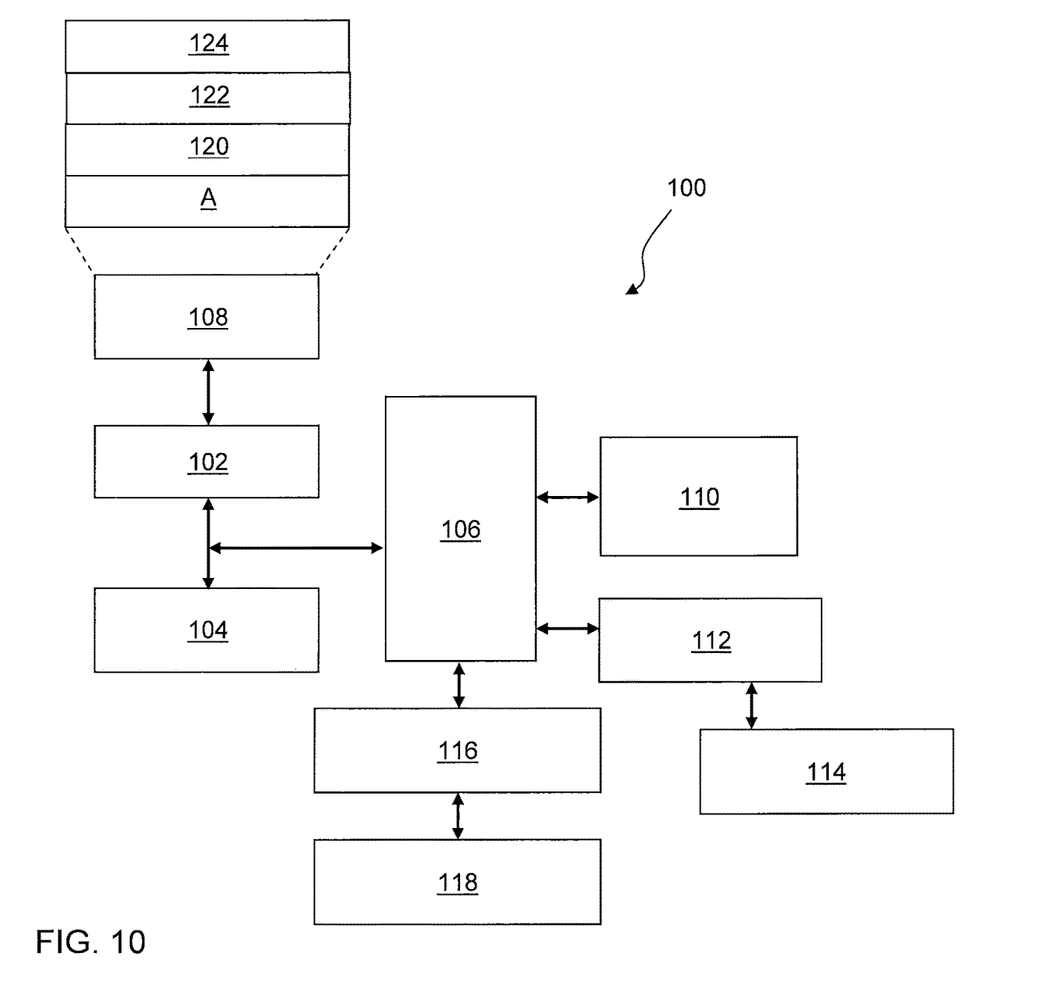
FIG. 10 is a block diagram of an example architecture for the computing device in FIG. 1.

FIG. 10 is a block diagram of an example architecture 100 of the computing device 1 in FIG. 1. The computing device 1 may include a memory interface 102, one or more processors 104 such as data processors, image processors and/or central processing units, and a peripherals interface 106. The one or more processors 104 may correspond to or include the processor 3 in FIG. 1. The memory interface 102, one or more processors 104 and/or peripherals interface 106 may be separate components or integrated in one or more integrated circuits. The various components in the computing device 1 may be coupled by one or more communication buses or signal lines. Sensors, devices, and subsystems may be coupled to the peripherals interface 106 to facilitate multiple functionalities.

Communication functions may be facilitated through one or more wireless communication subsystems 110, which can include radio frequency receivers and transmitters and/or optical (e.g., infrared) receivers and transmitters. For example, the computing device 1 may include communication subsystems 110 designed to operate over networks according to any cellular network protocol, as well as short-range wireless networks (e.g. WiFi, WiMax and Bluetooth™). The communication subsystem(s) 110 may also be configured for wired communication. The specific design and implementation of the communication subsystem 110 may depend on the communication network(s) over which the computing device 1 is intended to operate. The communication subsystem(s) 110 may correspond to or be included in the data interface 2 in FIG. 1.

An audio subsystem 112 may be coupled to audio hardware component(s) 114, such as a loudspeaker and a microphone, to facilitate voice-enabled functions, such as voice recognition, voice replication, digital recording, and telephony functions, as well as to enable playback of audio files. The audio hardware component(s) 114 may correspond to or be included in the audio interface 5 in FIG. 1.

An I/O subsystem 116 may include one or more input/output controllers coupled to input/output hardware component(s) 118, including but not limited to one or more of a touch screen, a display, a keyboard, a touch pad, one or more buttons, rocker switches, a thumb-wheel, an infrared port, a USB port, and a pointer device such as a stylus. The I/O subsystem 116 may at least partly correspond to the data interface 2 in FIG. 1.

The memory interface 102 may be coupled to a memory 108, which may correspond to or include the memory 4 in FIG. 1. The memory 108 may include high-speed random access memory and/or non-volatile memory, such as one or more magnetic disk storage devices, one or more optical storage devices, and/or flash memory (e.g., NAND, NOR). The memory 108 may store an operating system. The operating system may include instructions for handling basic system services and for performing hardware dependent tasks. The memory 108 may also store communication instructions to facilitate communicating with one or more external devices, such as servers. The memory 108 may also include graphical user interface instructions to facilitate graphic user interface processing. In some embodiments, the memory 108 may also store one or more audio files A for playback by the computer device 1, as well as contextual data 120 for the respective audio file. The memory 108 may also store application programs which include any program executable by the processor(s) 104. In some embodiments, certain application programs may be installed on the computing device 1 by its manufacturer, while other application programs may be installed by a user. As indicated in the foregoing and shown in FIG. 10, one application program 122 may implement a media player for playing audio files. In the example of FIG. 10, another application program 124 implements the control program that operates the media player in accordance with embodiments of the present invention. In another example, the application program 122 implements both the media player and the control program.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, a data processing apparatus. The computer readable medium may be non-transitory, including a machine-readable storage device, a'machine-readable storage substrate, a memory device, a composition of matter effecting a machine-readable propagated signal, or any combination thereof. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The invention claimed is:

1. A method of controlling playback of speech-containing audio data on a computing device comprising a processor, said method being executed by the processor in the computing device and comprising:
    operating a media player on the computing device to play the audio data,
    detecting a user-initiated time-shift command to step forward or backward in the audio data, and
    after detecting the time-shift command at a current time in the audio data, identifying a starting point of a sentence of a plurality of contiguous selectable sentences in the audio data and operating the media player to play the audio data from the starting point, at least a portion of the audio data being organized into the plurality of contiguous selectable sentences in a time window that encompasses the current time for any value of the current time.

2. The method of claim 1, wherein the starting point of the sentence is identified based on natural language processing of the audio data.

3. The method of claim 2, wherein the natural language processing comprises generating text corresponding to the audio data by operating a speech recognition algorithm on the audio data, and segmenting the text into the plurality of contiguous selectable sentences by operating a sentence segmentation algorithm on the text.

4. The method of claim 1, wherein the time-shift command indicates a step backward in the audio data, and wherein the starting point is identified as one of:
    a starting point of a set of consecutive sentences of the plurality of contiguous selectable sentences related to a current topic of the audio data at the current time;
    a starting point of a set of consecutive sentences of the plurality of contiguous selectable sentences with a predefined relation to the current time;
    a starting point of a set of consecutive sentences of the plurality of contiguous selectable sentences associated with a current speaker at the current time, or a set of consecutive sentences of the plurality of contiguous selectable sentences associated with another speaker immediately preceding the set of consecutive sentences associated with the current speaker; and
    a starting point of a set of sentences of the plurality of contiguous selectable sentences that provide a content summarization of a time segment in the audio data preceding the current time.

5. The method of claim 4, wherein the predefined relation is defined such that the set of consecutive sentences includes a roost recently started sentence at the current time.

6. The method of claim 4, wherein at least one of the starting point, a number of consecutive sentences in the set of consecutive sentences of the plurality of contiguous selectable sentences, a number of sentences in the set of sentences of the plurality of contiguous selectable sentences, and the time segment is obtained as a function of a control variable comprising one or more of:
    a text complexity index at the current time, the text complexity index indicating a complexity of spoken language in the audio data at the current time;
    a category classification of the audio data;
    a duration of a pausing of the media player, if the time-shift command is triggered by the pausing;
    an occurrence rate of time-shifting commands at the current time in the audio data for a population of different users; and
    a user interaction with a command interface of the computing device, such as a duration of the user interaction with the command interface, a degree of pressure applied to the command interface, or a user selection of a command element among a plurality of command elements on the command interface.

7. The method of claim 1, wherein the time-shift command indicates a step forward in the audio data, and wherein the starting point is identified as one of:
    a starting point of a sentence of the plurality of contiguous selectable sentences related to a topic that differs from a current topic of the audio data at the current time;
    a starting point of a sentence of the plurality of contiguous selectable sentences with a predefined relation to the current time; and
    a starting point of a sentence of the plurality of contiguous selectable sentences associated with a speaker that differs from a current speaker at the current time.

8. The method of claim 7, wherein the predefined relation is given as a count of started sentences of the plurality of contiguous selectable sentences after the current time.

9. The method of claim 4, further comprising: allocating a respective topic identifier to sentences in the audio data; wherein the method further comprises, for identifying the starting point:
    identifying the current topic by the topic identifier allocated to a most recently started sentence in the audio data at the current time, and
    searching among the topic identifiers based on the current topic to identity the starting point.

10. The method of claim 9, wherein the starting point of the sentence of the plurality of contiguous selectable sentences is identified based on natural language processing of the audio data, and wherein the natural language processing comprises generating text corresponding to the audio data by operating a speech recognition algorithm on the audio data, and segmenting the text into the plurality of contiguous selectable sentences by operating a sentence segmentation algorithm on the text, said method further comprising operating a topic segmentation algorithm on the text generated by the speech recognition algorithm to allocate the respective topic identifier to the the plurality of contiguous selectable sentences in the audio data.

11. The method of claim 4, further comprising: allocating a respective speaker identifier to the plurality of contiguous selectable sentences in the audio data;
wherein the method further comprises, for identifying the starting point:
identifying the current speaker by the speaker identifier allocated to a most recently started sentence of the plurality of contiguous selectable sentences in the audio data, and
searching among the speaker identifiers based on the current speaker to identify the starting point.

12. The method of claim 11, further comprising operating a voice recognition algorithm on the audio data to allocate the respective speaker identifier to the the plurality of contiguous selectable sentences in the audio data.

13. The method of claim 4, wherein the starting point of the sentence of the plurality of contiguous selectable sentences is identified based on natural language processing of the audio data, and wherein the natural language processing comprises generating text corresponding to the audio data by operating a speech recognition algorithm on the audio data, and segmenting the text into the plurality of contiguous selectable sentences by operating a sentence segmentation algorithm on the text, said method further comprising: operating an automatic summarization algorithm on the text generated by the speech recognition algorithm, within the time segment in the audio data, to generate the content summarization.

14. The method of claim 1, further comprising:
identifying starting times in the audio data for sentences of the plurality of contiguous selectable sentences of spoken language in the audio data, and
storing the starting times in an electronic memory, which is accessible to the processor, and
wherein the method further comprises, after detecting the time-shift command:
searching the electronic memory, based on the current time and in view of the time-shift command, to identify the starting point among the starting times corresponding to the sentences of the plurality contiguous selectable sentences of the spoken language in the audio data, and
playing the audio data at the starting point so as to play one or more sentences of the plurality of contiguous selectable sentences following upon the starting point in the audio data.

15. The method of claim 14, wherein the starting point of the sentence the plurality of contiguous selectable sentences is identified based on natural language processing of the audio data, wherein the natural language processing comprises generating text corresponding to the audio data by operating a speech recognition algorithm on the audio data, and segmenting the text into the plurality of contiguous selectable sentences by operating a sentence segmentation algorithm on the text, wherein the text comprises a sequence of words, and wherein the words are stored in the electronic memory in association with a respective time point, and wherein the sentence segmentation algorithm is operated on the words, before or during playback of the audio data, to segment the words into the plurality of contiguous selectable sentences and identify the starting times.

16. The method of claim 1, wherein the time-shift command is detected by detecting a user interaction with a dedicated control element in a command interface of the computer device.

17. The method of claim 1, wherein the time-shift command indicates a step backward in the audio data and is detected by detecting an instruction to pause the playback of the audio data.

18. A non-transitory computer-readable medium comprising computer instructions which, when executed by a processor of a computing device, cause the processor to perform operations comprising:
operating media player on the computing device to play speech-containing audio data,
detecting a user-initiated time-shift command to step forward or backward in the audio data, and
after detecting the time-shift command at a current time in the audio data, identifying a starting point of a sentence of a plurality of contiguous selectable sentences in the audio data and operating the media player to play the audio data from the starting point, at least a portion of the audio data being organized into the plurality of contiguous selectable sentences in a time window that encompasses the current time for any value of the current time.

19. A computing device for playback of speech-containing audio data, said computing device being configured to:
operate a media player on the computing device to play the audio data,
detect a user-initiated time-shift command to step forward or backward in the audio data, and
after detecting the time-shift command at a current time in the audio data, identify a starting point of a sentence of a plurality of contiguous selectable sentences in the audio data and operate the media player to play the audio data from the starting point, at least a portion of the audio data being organized into the plurality of contiguous selectable sentences in a time window that encompasses the current time for any value of the current time.

* * * * *

UNITED STATES PATENT AND TRADEMARK OFFICE
CERTIFICATE OF CORRECTION

PATENT NO. : 10,606,950 B2  
APPLICATION NO. : 16/084414  
DATED : March 31, 2020  
INVENTOR(S) : Ola Thörn Page 1 of 1

It is certified that error appears in the above-identified patent and that said Letters Patent is hereby corrected as shown below:

In the Claims

Column 18, Line 21, Claim 5:  
Please correct "roost" to read -- most --

Column 19, Line 53, Claim 14:  
Please correct "plurality contiguous" to read -- plurality of contiguous --

Column 20, Line 2, Claim 15:  
Please correct "sentence the plurality" to read -- sentence of the plurality --

Column 20, Line 29, Claim 18:  
Please correct "operating media" to read -- operating a media --

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*